(12) United States Patent
Nghiem

(10) Patent No.: US 6,378,194 B1
(45) Date of Patent: *Apr. 30, 2002

(54) METHOD FOR JOINING WORKPIECES, AND PRESSING DEVICE THEREFOR

(75) Inventor: Xuang Long Nghiem, Krefeld (DE)

(73) Assignee: Novopress GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,707

(22) Filed: Aug. 15, 1997

(30) Foreign Application Priority Data

Aug. 17, 1996 (DE) .......................... 196 33 199

(51) Int. Cl.⁷ .............................. B21D 39/00
(52) U.S. Cl. .................. 29/516; 29/407.05; 29/508; 29/705; 29/753; 72/19.8; 72/31.1; 72/412; 72/443; 72/446
(58) Field of Search ............. 29/516, 407.05, 29/517, 508, 407.01, 705, 753, 863; 72/19.8, 20.1, 20.2, 21.1, 21.2, 21.3, 31.11, 31.12, 374, 412, 414, 441, 443, 446, 453.14; 100/48, 50

(56) References Cited

U.S. PATENT DOCUMENTS

| | | | | |
|---|---|---|---|---|
| 4,250,607 A | * | 2/1981 | Lillbacka | 29/237 |
| 4,483,056 A | | 11/1984 | Schwalm et al. | 29/237 |
| 5,483,874 A | * | 1/1996 | Shizu et al. | 100/50 |
| 5,799,383 A | * | 9/1998 | Baldwin et al. | 29/407.5 |
| 5,949,352 A | * | 9/1999 | Ferrari | 340/870 |

FOREIGN PATENT DOCUMENTS

| | | | |
|---|---|---|---|
| DE | 1187870 | | 10/1965 |
| DE | 2136782 | | 12/1982 |
| DE | 3423283 | | 1/1986 |
| DE | 3505463 A | * | 8/1986 |
| DE | 4206439 | | 9/1993 |
| DE | 4321249 | | 1/1995 |
| DE | 295020326 | | 3/1995 |
| DE | 29604276 | | 6/1996 |
| EP | 0361630 | | 9/1989 |
| EP | 0451806 | | 4/1991 |
| EP | 0582543 | | 7/1993 |
| GB | 2219669 | * | 12/1989 |

* cited by examiner

Primary Examiner—P. W. Echols
Assistant Examiner—John C. Hong
(74) Attorney, Agent, or Firm—Liniak, Berenato, Longacre & White, LLC

(57) ABSTRACT

In a method for joining workpieces, in particular press fittings (24) to a pipe (23), the pressing device (1) is placed with its at least two pressing jaws (21, 22) in the open position against the joining point of the workpieces 23, 24), and the pressing jaws (21, 22) are then moved with respect to one another by means of a jaw drive (7, 50), while the workpieces (23, 24) deform plastically, into a terminal pressed position in which, at the latest, the application of power to the press jaws (21, 22) ends. According to the invention, the power of the jaw drive (7, 50) is controlled in such a way that, at least toward the completion of pressing, the pressing jaws (21, 22) have less kinetic energy than without a power controller. The invention further concerns a pressing unit (1) for carrying out said method.

33 Claims, 3 Drawing Sheets

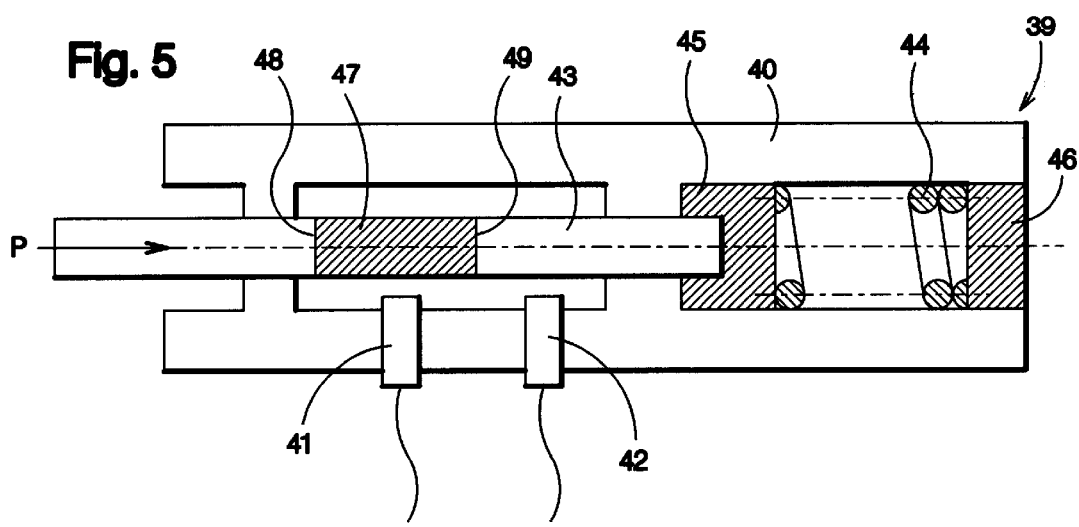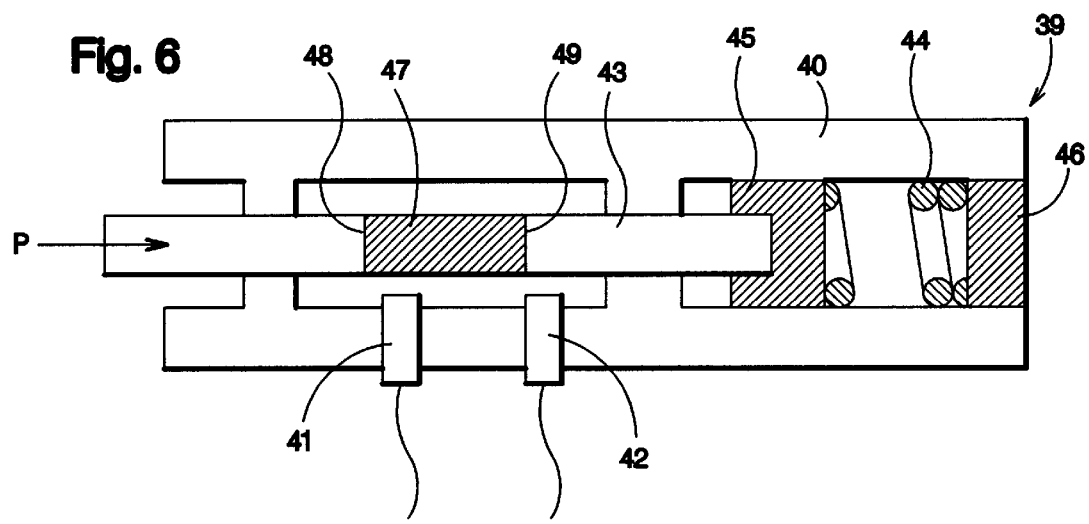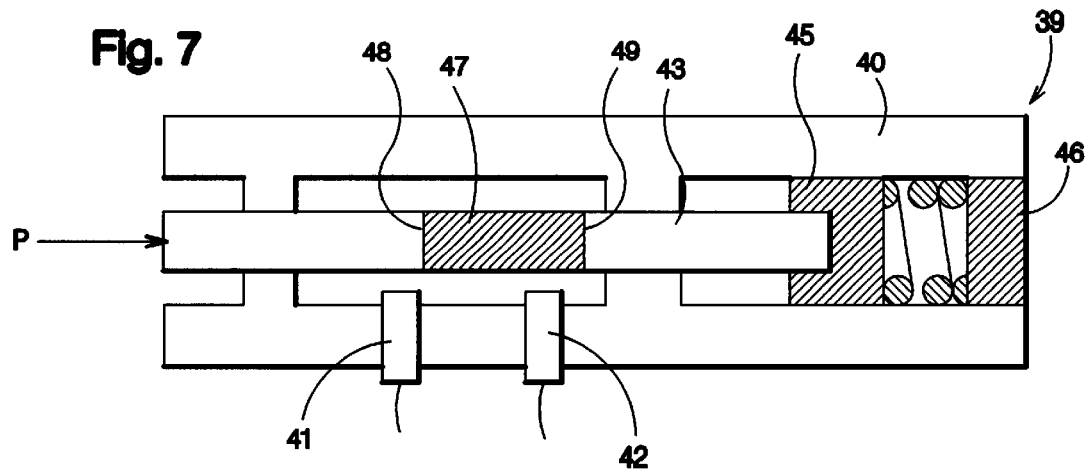

METHOD FOR JOINING WORKPIECES, AND PRESSING DEVICE THEREFOR

FIELD OF THE INVENTION

The invention concerns a method for joining workpieces, in particular press fittings to a pipe, in which a pressing device is placed with its at least two pressing jaws in the open position against the joining point of the workpieces, and the pressing jaws are then moved with respect to one another by means of a jaw drive, while the workpieces deform plastically, into a terminal pressed position in which, at the latest, the application of power to the press jaws ends. The invention further refers to a pressing device for joining such workpieces, having at least two pressing jaws and a jaw drive for moving the pressing jaws from an open position into a terminal pressed position, and having a control device for controlling the jaw drive, the pressing device being configured so that the application of power to the press jaws ends, at the latest, when the terminal pressed position is attained.

It is known, in order to join pipes, to use sleeve-like press fittings which, in order to produce a pipe joint, are slid over the pipe ends and then pressed radially together, both the press fitting and the pipe being plastically deformed. Pipe joints of this kind and the pertinent press fittings are known, for example, from DE-C-11 87 870, EP-B-0 361 630, and EP-A-0 582 543.

Pressing takes place with the aid of pressing devices such as are known in various embodiments, for example from DE-C-21 36 782, DE-A-34 23 283, EP-A-0 451 806, EP-B-0 361 630, and DE-U-296 04 276.5. The pressing devices have a pressing jaw unit having at least two or sometimes more pressing jaws, which during the pressing operation are moved radially inward to form a substantially closed pressing space. A jaw drive is provided for this movement, for example in the form of an electric motor or a hydraulic pressure cylinder or a combination of the two.

In the case of the known pressing devices, the jaw drive always travels toward a specific, constant terminal force. Terminal force limiters, for example in the form of an overpressure valve in the case of a hydraulic pressure cylinder, a torque coupling in the case of a rotating drive, or an overcurrent release in the case of an electric motor, are provided for this purpose. To ensure that compete pressing takes place in all circumstances, the terminal force is set relatively high. The reason is that inaccuracies in the terminal force limiter have a strong effect on the terminal force that can actually be attained, since terminal force limiters do not measure directly the force proceeding from the jaw drive, but rather a converted magnitude which represents only a fraction of the actual drive force. The high terminal force leads to wear on the bearing points of the pressing jaws, and all the parts acted upon by the jaw drive must be dimensioned accordingly.

The problems described above even if the jaw drive is matched to the particular pressing jaw unit connected to it, and also to the workpieces to be pressed therewith. Usually, however, a specific jaw drive is used for a jaw set made up of a plurality of pressing jaw units which are configured for pressing different diameters. For this purpose, the jaw drive can easily be detached from the particular pressing jaw unit and attached to another pressing jaw unit. In order for the jaw drive to be usable for all the pressing jaw units of a jaw set, the jaw drive and the terminal force limiter are designed so that the jaw drive and the terminal force achievable therewith are sufficient for pressing with even the largest pressing jaw unit.

The problems described above occur even with these pressing units. They become more serious as the pressing jaw units become smaller, and thus as the deformation work to be performed decreases. The terminal force at which the jaw drive is shut down is then far greater than the actual force needed. As a result, the pressing jaw units for small workpiece diameters must be grossly overdimensioned, i.e. they are heavier and more costly than necessary, and are subject to severe wear. But since it would be even more expensive to provide a matched jaw drive for each pressing jaw unit (not to mention transport problems), this is necessarily accepted.

In the case of the pressing devices described above, the jaw drive acts on a ram with spreader rollers, which during the pressing operation is moved out toward the pressing jaw unit. In the process, the spreader rollers travel between two pivot levers, arranged in mirror-image fashion, and spread them apart by acting on opposing spreading surfaces on the pivot levers. The pressing jaws, which are moved together by the spreading of the pivot levers, sit at the free ends of the pivot levers.

The pressing device described in DE-A-43 21 249 operates in the reverse fashion, i.e. during the pressing operation, the ram is pulled toward the jaw drive. At the beginning of the pressing operation, the spreader rollers are located between the pivot levers close to their pivot axes. The spreading surfaces enclose a gap which tapers in a V-shape toward the jaw drive and which, during the pressing operation, is expanded by the spreader rollers, thus reducing the angle of the V. When the terminal pressed position is reached, the spreader rollers enter a section between the pivot levers in which the spreading surfaces run parallel to one another, so that no further force is transferred onto the pressing jaws. A limit switch which automatically shuts down the motor is located in this section.

It is the object of the invention to make available a method which puts less load on the moving parts of the pressing device, and causes less wear during pressing. A further object is to provide a suitable pressing device therefor.

With regard to the method, the object is achieved, according to the invention, by the fact that the power of the jaw drive is controlled in such a way that, at least toward the completion of pressing, the pressing jaws have less kinetic energy than without a power controller.

This proposal is based on the recognition, already part of the invention, that when the full, i.e. uncontrolled, power of the jaw drive is present, considerable kinetic energy builds up in the parts being moved by it, in particular in the pressing jaw unit, principally in the first phase when a nonworking stroke is being performed. The less the work of deformation to be performed, the less such energy builds up.

The result of the reduction in kinetic energy according to the invention is that the maximum force which acts on the parts moved by the jaw drive is substantially reduced, and ideally is the same as the maximum force to be applied when deforming the workpieces.

Preferably the jaw drive is shut down, at the latest, when the terminal pressed position is reached. As a result of position-dependent shutdown of the jaw drive, in conjunction with the reduction in kinetic energy (which ideally equals zero at the completion of pressing), no high forces, resulting from kinetic energy still present at that time, occur after shutdown of the jaw drive. The press jaw units can accordingly, in particular in the lower size range, be of much lighter dimensions, and wear is also considerably less.

As far as the type of power profile is concerned, the basic inventive idea can be carried out in various ways. It is conceivable, for example, for the pressing jaws to be acted upon at full power from the outset, but for the jaw drive to be shut down before the terminal pressed position is reached. The work of deformation can then be performed by the kinetic energy stored in the moving parts, such that said energy partially or entirely dissipates up until the terminal pressed position. Shutdown of the jaw drive can then be effected as a function of the size of the pressing unit, in such a way that the less work of deformation to be performed—i.e. as a general rule, the smaller the diameter of the workpieces being pressed, and the softer their configuration—the earlier it occurs.

As an alternative thereto, provision is made for the pressing jaws, in a first phase of the pressing operation in which a nonworking stroke is being performed, to be acted upon by a power profile in which the power is reduced in such a way that the pressing jaws have, at least at the end of this phase, less kinetic energy than without power limiting. Preferably, the power profile in this context should be such that the kinetic energy of the pressing jaws in the first phase does not exceed that at the completion of pressing. This proposal is based on the observation that, especially in the nonworking stroke phase, a high kinetic energy builds up which is then not, or only insufficiently, dissipated in the actual pressing phase. If the kinetic energy in the first phase is kept low by reducing the power of the jaw drive, it then no longer leads, or leads only insignificantly, to an increase in kinetic energy in the pressing phase. In this context, it may additionally be appropriate to configure the power profile in such a way that the kinetic energy of the pressing jaws falls off toward the completion of pressing, by again reducing the power output of the jaw drive in the terminal phase.

Even with the power profile described above, it may be advantageous for the application of power to the pressing jaws to be discontinued even before the terminal pressed position is reached, so that the remainder of the work of deformation is performed by the kinetic energy which is then still stored in the moving parts. Ideally, power application should be discontinued in such a way that the kinetic energy equals zero when the terminal pressed position is reached.

It is understood that particularly optimum conditions are achieved when the power profile is adapted steplessly to the particular work to be performed, in particular with the goal, according to the invention, of having as little kinetic energy as possible at completion of pressing. Great progress is, however, achieved even if the power profile changes in steps, even if only one step is present, for example in the form of a first phase during which operation occurs at reduced power, and a second phase in which the pressing jaws are acted upon by full power. The switchover from the first to the second phase can then be adapted to the particular pressing jaw unit, advantageously in such a way that the less work of deformation to be performed—i.e., usually, the smaller the diameter of the workpieces and the softer their material—the further the switchover is shifted toward the completion of pressing.

As far as the pressing device is concerned, there is provided in order to carry out the method described above a control device having a power control device which generates a power profile for the jaw drive such that the pressing jaws have, at least at the completion of pressing, less kinetic energy than without a power controller. The aforementioned alternatives of the method according to the invention can be implemented depending on the embodiment of the power control device. If the power profile is configured in two steps, the power control device can be embodied in such a way that the first phase extends into the deformation range, and to a greater extent, the less the work of deformation to be performed.

In terms of the physical configuration of the power control device, the general existing art in the field of power control of electric motors can be utilized. An electronic power controller is particularly suitable.

In a particularly preferred embodiment, a limit switch is provided in order to shut down the jaw drive, at the latest, when the terminal pressed position is reached. The limit switch can be triggered by the control device in such a way that the jaw drive is shut down before the terminal pressed position is reached, so as to utilize the kinetic energy still stored in the moving parts for residual deformation of the workpiece, with the goal of making the greatest possible use of the kinetic energy when the terminal pressed position is reached.

In a particularly preferred embodiment, the limit switch has a sensor for sensing the position of the pressing jaws, which is coupled to the control device in such a way that the power control device is triggered as a function of the position of the pressing jaws. According to this feature, therefore, the position of the pressing jaws is sensed directly and utilized for the power control device. It is particularly advantageous in this context if the sensor is coupled to a signal generator for the power control device, specifically and in particular if the sensor and optionally the signal generator are arranged on the pressing jaws themselves. This makes it possible to adjust the sensor and signal generator to the particular pressing jaw unit in each case so that a power profile which is optimally adapted to that pressing jaw unit is achieved, as a function of the actual position of the pressing jaws. The sensor (and optionally the signal generator) should be arranged on two adjacent pressing jaws in such a way that it senses the position of said pressing jaws with respect to one another, preferably in the region of the opposing end surfaces.

This can be done, for example, by the fact that the sensor has in each case a movably mounted feeler which coacts with a stop against which the feeler arrives as the pressing jaws close. The feeler can be installed on one pressing jaw, and the stop on the adjacent pressing jaw. It is also advantageous if the stop is configured adjustably in the movement direction of the feeler.

The invention is elucidated further, with reference to an exemplifying embodiment, in the drawings, in which:

FIGS. 5 to 7 show enlarged depictions of the clearance sensor device of the pressing jaw unit according to FIG. 3, in various positions.

Figure 2:
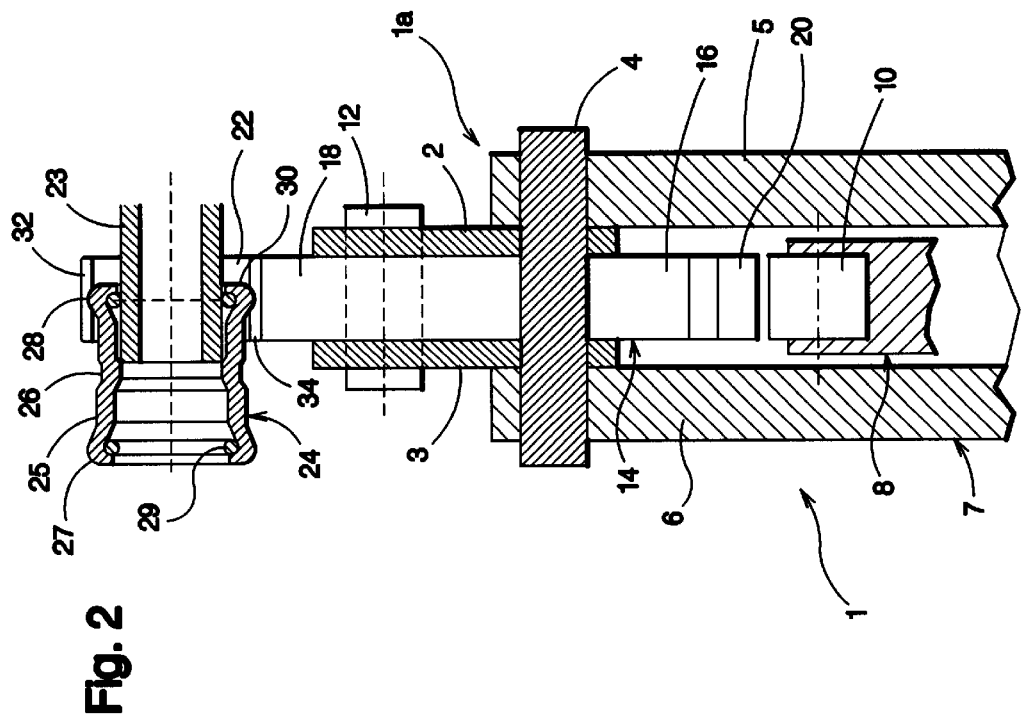
FIG. 2 shows a cross section through the pressing device according to FIG. 1, in plane A—A.
Figure 1:
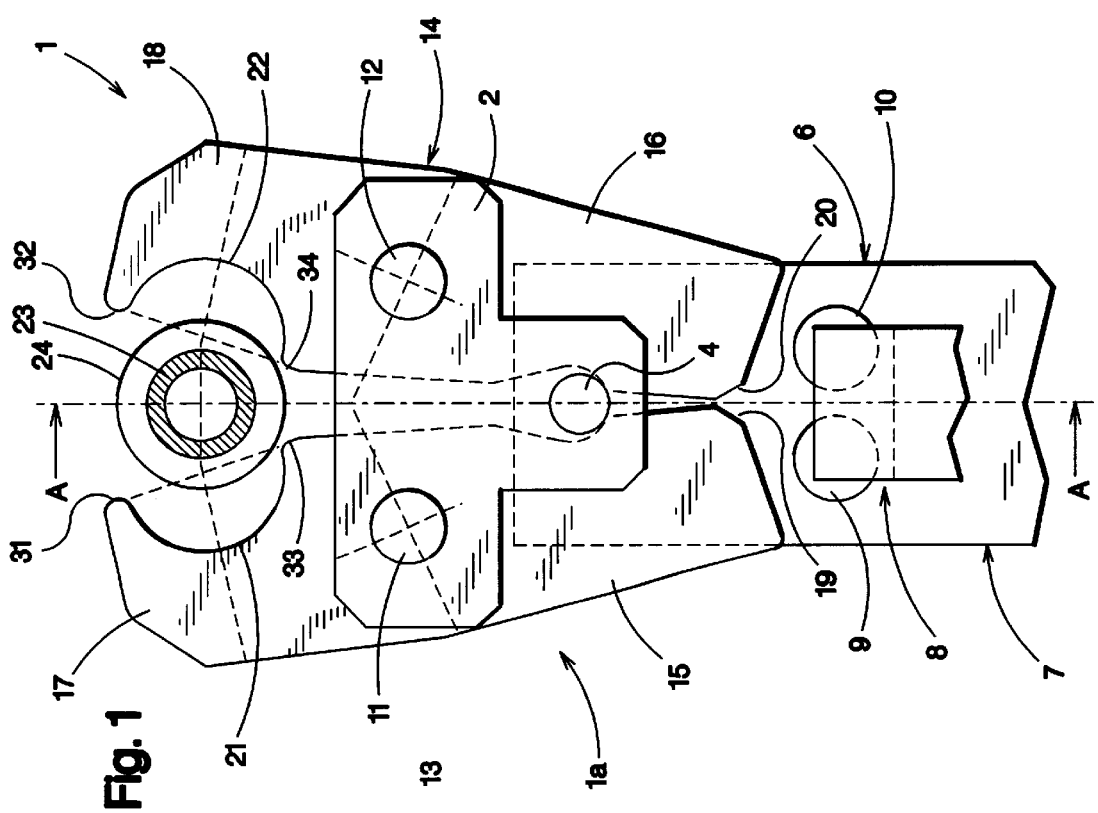
FIG. 1 shows a pressing device in a front view in the open position, with press fitting and pipe end.

Pressing device 1 depicted in FIGS. 1 and 2 has a pressing jaw unit 1a with two T-shaped bearing plates 2, 3, which—as seen in the front view of FIG. 1—are arranged exactly one behind the other. A connecting bolt 4 passes through bearing plates 2, 3 in their lower part. Placed on said connecting bolt 4 on both sides are support plates 5, 6 (front support plate 5 is omitted in FIG. 1), which are part of the jaw drive labeled 7 in its entirety. They are depicted only in their upper region.

An electric drive motor (not depicted here in further detail), which is also part of jaw drive 7 and acts on a drive rod, is attached to the lower ends of support plates 5, 6. The upper end of the drive rod is equipped with a drive head 8 which is fork-shaped on its top side. Inside drive head 8, two drive rollers 9, 10 are mounted next to one another so as to rotate freely about a horizontal axis. With the aid of the drive motor, drive head 8 can be moved vertically upward and also back downward again. Connecting bolt 4 is configured removably, so that the entire jaw drive 7 can easily be removed from pressing jaw unit 1*a*.

Bearing bolts 11, 12, arranged with a clearance between them, pass through bearing plates 2, 3 in the upper region. A pivot lever 13, 14 is mounted between bearing plates 2, 3 on each of bearing bolts 11, 12. The two pivot levers 13, 14 are of mirror-symmetrical configuration. They have drive arms 15, 16 proceeding downward, and jaw arms 17, 18 proceeding upward, from bearing bolts 11, 12. Drive arms 15, 16 have drive surfaces 19, 20 which—looking from the outside in—initially have only a slight V-shaped inclination to the horizontal, and then transition into a region proceeding steeply upward. Semicircular recesses which form the contour of pressing jaws 21, 22 are shaped into the mutually opposing sides of jaw arms 17, 18.

FIGS. 1 and 2 show pressing device 1 in the open position, in which drive head 8 assumes its lowest position in which it is not in contact against drive arms 15, 16. Pressing device 1 is placed against a pipe joint in such a way that it lies between pressing jaws 21, 22. The pipe joint has a pipe end region 23 over which a press fitting 24 is partially slid. This is particularly evident from FIG. 2, in which pipe end region 23 and press fitting 24 are depicted in axial section. Press fitting 24 has a cylindrical section 25 with a centrally located constriction 26 serving as a stop for pipe end region 23. At its free ends, press fitting 24 has outwardly curved annular ridges 27, 28 into the inside of each of which an elastomeric sealing ring 29, 30 is laid. Pressing jaws 21, 22 are located at the level of annular ridge 28 on the right side of FIG. 2.

For the pressing operation, the drive motor of jaw drive 7 is started up so that the drive rod, together with drive head 8 attached thereon, moves out and upward. Drive rollers 9, 10 thus come into contact initially against the shallow-inclination sections of drive surface[s] 19, 20. With further upward travel, drive arms 15, 16 are spread apart, with the result that jaw arms 17, 18 approach one another, performing a nonworking stroke until pressing jaws 21, 22 come into contact against annular ridge 28. As drive head 8 travels farther upward, the actual pressing operation then begins, in which annular ridge 28 and the immediately adjacent region of cylindrical section 25 are plastically deformed radially inward. In the last stage of pressing, pipe end region 23 is then also plastically deformed radially inward. In this process, drive rollers 9, 10—as is evident from FIGS. 3 and 4—move into the region between drive arms 15, 16, where drive surfaces 19, 20 are at a very acute angle, i.e. are inclined very steeply with respect to one another. The pressing operation is complete when upper end surfaces 31, 32 and lower end surfaces 33, 34 have reached a defined terminal pressed position in which they either have come into contact or have only a defined minimum clearance.

Figure 3:
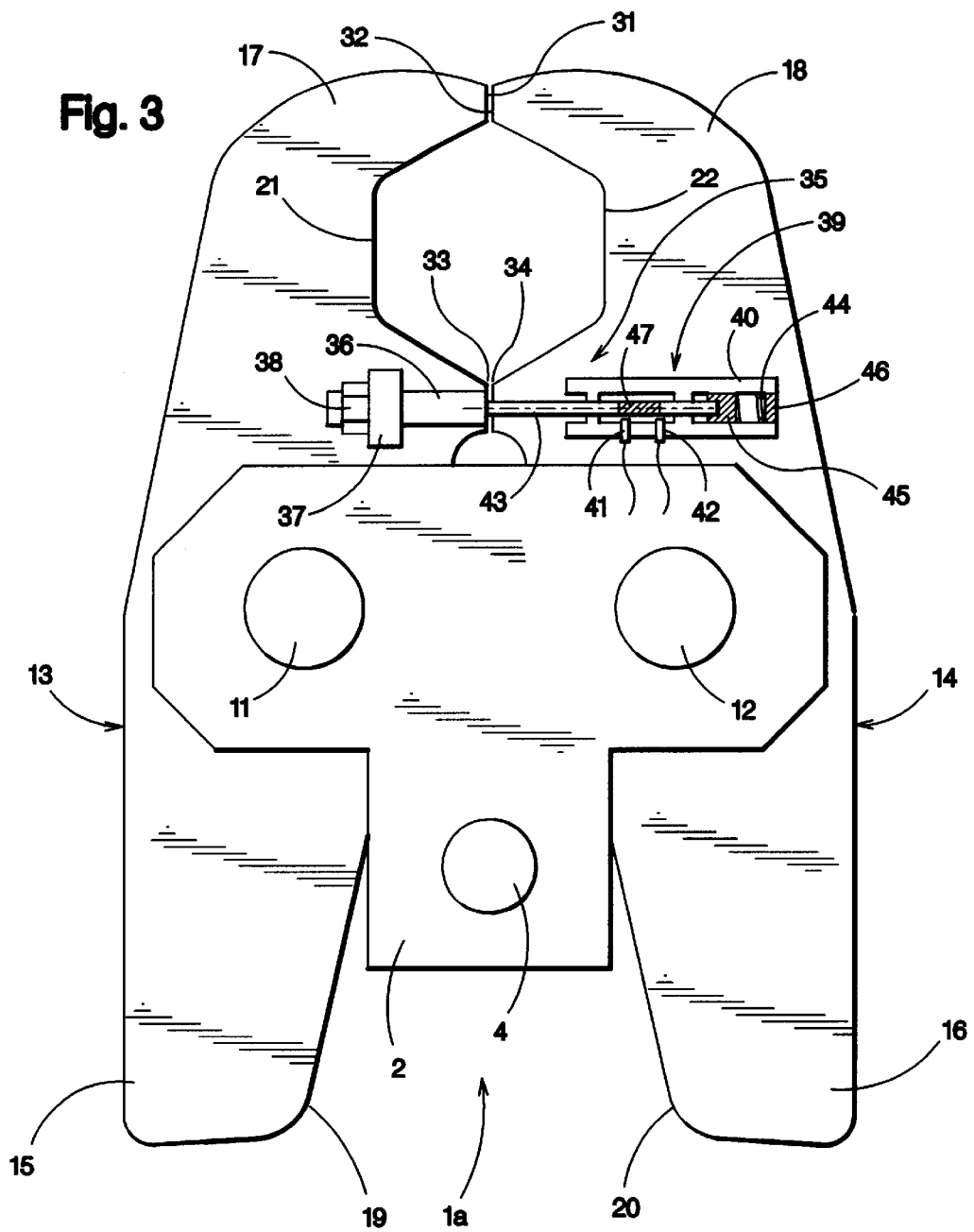
FIG. 3 shows a front view of the pressing jaw unit of the pressing device according to FIGS. 1 and 2, with an electrical sensor.

FIG. 3 depicts only pressing jaw unit 1*a* of pressing device 1, in an almost-closed position. Jaw drive 7 has been removed. Arranged at the level of the lower pair of end surfaces 33, 34 of pressing jaws 21, 22 is—in addition to the depiction of FIG. 1—a clearance sensor labeled 35 in its entirety, by means of which the clearance between end surfaces 33, 34 can be sensed. Clearance sensor 35 has a stop pin 36 that is screwed into a holder block 37 attached to jaw arm 17. By means of the threads in the through hole of holding block 37, stop pin 36 can be axially adjusted in such a way that it projects slightly beyond end surface 33 into the gap present there. Once arrived at, the setting can be locked by means of a lock nut 38.

Installed opposite stop pin 36 on right-side jaw arm 18 is a clearance sensor device operating on an eddy-current basis. It has a guide housing 40. A first sensor 41 and a second sensor 42 are installed in the lower part of guide housing 40, horizontally next to one another and with a clearance from one another. The two sensors 41, 42 operate on the eddy-current principle. A measurement pin 43 is guided displaceably in the longitudinal direction, i.e. horizontally, in guide housing 40. It projects out of guide housing 40 in the direction of the opposing end surface 33. A compression spring 44 which attempts to move measurement pin 43 toward stop pin 36 is arranged in guide housing 40 at the end away from end surface 33. Compression spring 44 is enclosed between two support members 45, 46, left-side support member 45 being joined to measurement pin 43 and guided displaceably along with it, while right-side support member 46 is held in stationary fashion in guide housing 40.

Measurement pin 43 is made of a non-metallic material, specifically plastic. In the center region it is surrounded by a metal sleeve 47 which forms sleeve edges 48, 49 at its ends.

Figure 4:
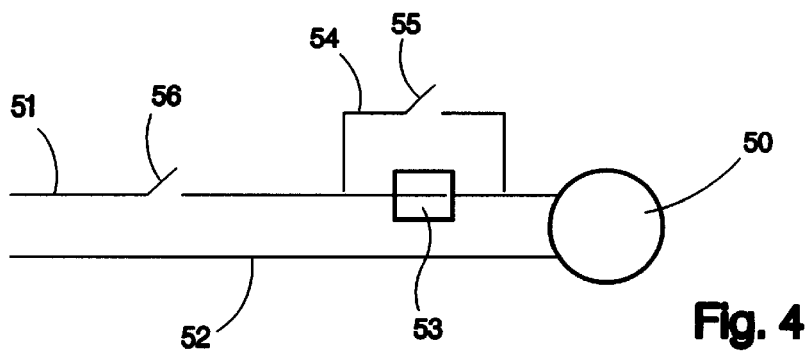
FIG. 4 shows a circuit diagram for the power controller of the pressing device according to FIGS. 1 and 3.

FIG. 4 shows a schematic circuit diagram for controlling drive motor 50, which is configured as an electric motor and is part of jaw drive 7. It can be connected via supply lines 51, 52 to an electrical power grid. Located in the top supply line 51 is a power reduction device 53 which electronically limits the power of drive motor 50 by phase angle control. Power reduction device 53 is bypassed by a parallel line 54 in which a bypass switch 55 is located. An on/off switch 56 is located before the point where parallel line 54 branches off. Both bypass switch 55 and on/off switch 56 are connected to a control device (not depicted in further detail here). Said control device is also coupled to sensors 41, 42.

At the beginning of a pressing operation, pressing device 1 is in the open position shown in FIG. 1. In this position, measurement pin 45 is pushed to the farthest extent out of guide housing 40 toward stop pin 36. As FIG. 5 shows, metal sleeve 47 is located in the region of first left-side sensor 41, but not in the region of second right-side sensor 42. Damping of the oscillator circuit thus occurs only at first sensor 41. The control device interprets this accordingly, and emits signals such that bypass switch 55 assumes an open position, and on/off switch 56 is closed. Drive motor 50 can be put into operation by means of a further manual switch, operable from outside and not shown here in more detail. The result is that pressing jaws 21, 22 are brought together, initially with reduced power and thus substantially more slowly than if acted upon by full power.

As of a certain position, stop pin 36 comes into contact against measurement pin 43, so that the latter is pushed out of its idle position, against compression spring 44, into guide housing 40. The beginning of this movement is shown in FIG. 5, the action of stop pin 36 being symbolized by arrow P. The result of the displacement of measurement pin 43 is that metal sleeve 47 enters the effective region of second sensor 42 with its right-side sleeve edge 49, and there causes damping of the oscillator circuit (FIG. 6). This generates an input signal at the control device, and generates therein an output signal for bypass switch 55, with the result that the latter is closed. The result of this is that drive motor 50 puts out its full power for the further movement of pressing jaws 21, 22 toward one another.

In the region of the desired terminal position of pressing jaws 21, 22, the resulting position of measurement pin 43 is as shown in FIG. 7. In this position, metal sleeve 47 has now moved out of the influence region of first sensor 41, so that damping there is eliminated. This generates a signal which causes on/off switch 56 to open. The supply of energy to drive motor 50 is thereby interrupted.

The power controller of drive motor 49 described above has the advantage that the parts of pressing device 1 moved by it (in particular drive head 8 with drive rollers 9, 10, and pivot levers 13, 14) are moved at the beginning of the pressing operation—and thus principally in order to perform the nonworking stroke—at a considerably lower speed than without power reduction by means of power reduction device 53. The moving parts thus store only a correspondingly reduced amount of kinetic energy. It should be no greater than that occurring during the actual pressing operation, i.e. in the phase when press fitting 24 and pipe end region 23 are being deformed. The result of this in turn is that when drive motor 50 is shut down by means of on/off switch 56, only a small residue of kinetic energy is still present.

The switchover from the first phase with power reduction to the second phase without said reduction can be adapted to the particular configuration of pressing jaw unit 1a. The adaptation is made in such a way that the smaller the masses moved by drive motor 50, and the softer the combination of press fitting 24 and pipe end region 23, the later the switchover occurs during the pressing operation. In general, the smaller the diameter of press fitting 24 that is being pressed, the smaller also are the masses to be moved. In the case of large pressing jaw units 1a for pressing large diameters, in which a high level of work of deformation must be performed, the position of metal sleeve 47 and/or the clearance between sensors 41, 42 and/or the length of metal sleeve 47 will be configured in such a way that metal sleeve 47 arrives as soon as possible, with right-side sleeve edge 49, in the influence region of second sensor 42. In the case of small pressing jaw units 1a for pressing smaller diameters, the procedure will be correspondingly the reverse. Moreover it is also possible, by means of the configuration of metal sleeve 47 and the arrangement of sensors 41, 42, to define that the shutdown of drive motor 50 takes place even before pressing jaws 21, 22 have reached the terminal pressed position, so that the residual kinetic energy causes pressing jaws 21, 22 to close down to the terminal pressed position.

It is clear from the description above that it is easy to associate with each pressing jaw unit 1a an individually adapted clearance sensor 35 which, when jaw drive 7 is attached to the respective pressing jaw unit 1a, ensures a correspondingly adapted power profile of drive motor 50, the goal being as little kinetic energy as possible is built up in the masses moved by drive motor 50 toward the completion of pressing. This reduces stresses in particular on pressing jaw unit 1a, so that it can have substantially lighter dimensions and is subject to less wear.

What is claimed is:

1. A method for joining workpieces in which a pressing device (1) is placed with its at least two pressing jaws (21, 22) in an open position against the workpieces (23, 24), and the pressing jaws (21, 22) are then uninterruptedly moved with respect to one another by means of a jaw drive (7, 50), while the workpieces (23, 24) deform plastically, into a terminal pressed position in which application of power to the press jaws (21, 22) of the jaw drive (7, 50) is controlled by a power control device that generates a power profile for application of the power between a first power when the jaws are in the open position and a second power at the terminal pressed position so that application of power follows the power profile and causes the terminal pressed position to be achieved and the workpieces thereby joined.

2. The method as defined in claim 1, wherein the jaw drive (7, 50) is shut down, at the latest, when the terminal pressed position is reached.

3. The method as defined in claim 1, wherein power is applied according to a power profile so that the pressing haws (21, 22) have, at least at the end of this phase, reduced kinetic energy than compared to the beginning of this phase.

4. The method as defined in claim 3, wherein the power profile of the jaw drive (7, 50) is such that the kinetic energy of the pressing jaws (21, 22) in the first phase does not exceed the kinetic energy at the completion of pressing.

5. The method as defined in claim 1, wherein kinetic energy of the pressing jaws (21, 22) falls toward the completion of pressing.

6. The method as defined in claim 1, including the step of discontinuing the application of power to the pressing jaws (21, 22) before the terminal pressed position is reached.

7. The method as defined in claim 1, wherein the power profile is adapted steplessly to a pressing operation of the pressing jaws.

8. The method as defined in claim 1, wherein the power profile changes in steps.

9. The method of claim 1, wherein the power control device reduces the power being applied to the pressing jaws as the pressing jaws approach the terminal pressed position.

10. A pressing device (1) for joining workpieces, (24) to pipe (23), having at least two pressing jaws (21, 22) and a jaw drive (7, 50) for uninterruptedly moving the pressing jaws (21, 22) from an open position into a terminal pressed position, and having a control device for controlling the jaw drive (7, 50), wherein the control device has a power control device (35, 53) which generates a power profile between a first power when the jaws are in the open position and a second power when the jaws are at the terminal pressed position for the jaw drive (7, 50) so that the power applied to the pressing jaws (21, 22) follows the power profile and uninterruptedly moves the pressing jaws from the open position to the terminal pressed position and thereby causes the workpieces to be joined together.

11. The pressing device as defined in claim 10, wherein, in a first phase of the pressing operation in which a nonworking stroke is being performed, the power control device (35, 53) generates the power profile so that the pressing jaws (21, 22) have, at least at the end of this phase, reduced kinetic energy.

12. The pressing device as defined in claim 11, wherein the power control device (35, 53) generates the power profile so that the kinetic energy of the pressing jaws (21, 22) in the first phase does not exceed the kinetic energy at the completion of pressing.

13. The pressing device as defined in claim 11, wherein the power profile has two steps so that the power applied to the jaw drive (7, 50) is reduced in the first phase.

14. The pressing device as defined in claim 11, wherein the power control device (35, 53) is configured so that the first phase at least partially occurs during deformation of the workpieces by the pressing jaws.

15. The pressing device as defined in claim 10, wherein a limit switch (56) shuts down the jaw drive (7, 50), at the latest, when the terminal pressed position is reached.

16. The pressing device as defined in claim 15, wherein the control device triggers the limit switch (56) so that the jaw drive (7, 50) is shut down before the terminal pressed position is reached.

17. The pressing device as defined in claim 15, wherein the limit switch (56) is connected to a sensor (35) for sensing the position of the pressing jaws (21, 22), and is coupled to the control device so that the power control device (53) operates as a function of the position of the pressing jaws (21, 22).

18. The device of claim 10, wherein the power control device generates a power profile for the jaw drive so that the power applied to the pressing jaws is reduced toward the completion of pressing.

19. A pressing device (1) for joining workpieces, (24) to pipe (23), having at least two pressing jaws (21, 22) and a jaw drive (7, 50) for uninterruptedly moving the pressing jaws (21, 22) from an open position into a terminal pressed position, and having a control device for controlling the jaw drive (7, 50), wherein the control device has a power control device (35, 53) which generates a power profile for the jaw drive (7, 50) so that the power applied to the pressing jaws (21, 22) is reduced in comparison with an uncontrolled drive toward the completion of pressing and the jaws move uninterruptedly to the terminal pressed position, a limit switch operably connected to the jaw drive for shutting down the jaw drive no later than when the terminal pressed position is achieved, and a sensor operable connected to the limit switch and to the control device for sensing the position of the pressing jaws so that the power control device operates as a function of the position of the pressing jaws.

20. The pressing device as defined in claim 19, wherein the sensor (35) is equipped with a signal generator (39) communicating with the power control device (53).

21. The pressing device as defined in claim 19, wherein the sensor (35) is arranged on one pressing jaw (21, 22) so that the position of said pressing jaw (21) with respect to an adjacent pressing jaw (22) is sensed.

22. The pressing device as defined in claim 18, wherein the sensor (35) and the signal generator (39) are arranged on the pressing jaws (21, 22).

23. The pressing device as defined in claim 19, wherein the sensor (35) is arranged on two adjacent pressing jaws (21, 22) in such a way that it senses the position of said pressing jaws (21, 22) relative to one another.

24. The pressing device as defined in claim 19, wherein the sensor (35) is arranged in the region of the opposing end surfaces (33, 34) of two adjacent pressing jaws (21, 22).

25. The pressing device as defined in claim 19, wherein the sensor (35) has a movably mounted feeler (43) which coacts with a stop (36) against which the feeler (45) contacts as the pressing jaws (21, 22) close.

26. The pressing device as defined in claim 25, wherein the feeler (43) is installed on one pressing jaw (22), and the stop (36) on and adjacent pressing jaw (21).

27. The pressing device as defined in claim 25, wherein the stop (36) is adjustably moveable in the direction of the feeler (42).

28. A method for joining workpieces, comprising the steps of:
  a. providing a press device having at least two pressing jaws moveable between an open position and a terminal pressed position in response to application of power from an operating jaw drive controlled by a controller;
  b. placing the press device in the open position about workpieces to be joined;
  c. operating the jaw drive and thereby causing the press jaws to uninterruptedly move toward the terminal pressed position so that the workpieces are plastically deformed; and
  d. controlling operation of the jaw drive with the controller so that the power applied to the pressing jaws is reduced in comparison with an uncontrolled drive as the press jaws uninterruptedly approach the terminal pressed position.

29. A pressing device for joining workpieces, comprising:
  a) at least two cooperating moveable press jaws, said jaws moveable between an open position and a terminal pressed position;
  b) a jaw drive operably associated with said press jaws for uninterruptedly moving said press jaws between said open position and said terminal pressed position; and
  c) a controller including a power control device generating a power profile operably associated with said jaw drive and uninterruptedly controlling operation of said jaw drive so that the power applied to the press jaws follows the power profile as the press jaws initially approach the workpieces.

30. A method for joining workpieces, comprising the steps of:
  a) providing at least two coaxial workpieces;
  b) providing a pressing device having at least two pressing jaws and a power controller for applying power in order to cause the jaws to uninterruptedly move between an open position and a terminal pressed position;
  c) generating a power profile to be followed between a first power when the jaws are in the open position and a second power when the jaws are in the terminal pressed position;
  d) placing the jaws in the open position about the workpieces;
  e) causing the power controller to apply power following the power profile to the jaws so that the jaws are brought into engagement with the workpieces and thereafter the workpieces are joined by being plastically deformed by the pressing jaws as the pressing jaws uninterruptedly move to the terminal pressed position.

31. A method for joining workpieces in which a pressing device (1) is placed with its at least two pressing jaws (21, 22) in the open position against the workpieces (23, 24), and the pressing jaws (21, 22) are then uninterruptedly moved with respect to one another by means of a jaw drive (7, 50), while the workpieces (23, 24) deform plastically, into a terminal pressed position in which application of power to the press jaws (21, 22) of the jaw drive (7, 50) by means of an electric motor (50) is controlled by a power control device (53) electronically limiting the power of electric motor (50) so that application of power to the pressing jaws (21, 22) is less than the power that would be applied if the power control device were not present.

32. The method of claim 31, including the steps of:
  a) causing the power control device to operate the jaw drive at a first power as the press jaws approach the workpieces; and
  b) causing the power control device to operate the jaw drive at a second power after the press jaws engage the workpieces.

33. The method of claim 32, including the step of:
  a) regulating the power control device by at least a first limit switch engageable with the workpieces.

* * * * *